(12) United States Patent
Nielsen

(10) Patent No.: US 6,641,004 B2
(45) Date of Patent: Nov. 4, 2003

(54) DISPENSING ASSEMBLY FOR AUTOMATICALLY ADJUSTING THE CARBON DIOXIDE LEVEL IN BEER IN A DRAUGHT BEER KEG

(75) Inventor: Torben Lindgaard Nielsen, Borre (DK)

(73) Assignee: Gram-Inventa A/S, Aabenraa (DK)

( * ) Notice: Subject to any disclaimer, the term of this patent is extended or adjusted under 35 U.S.C. 154(b) by 0 days.

(21) Appl. No.: 10/203,534
(22) PCT Filed: Dec. 19, 2000
(86) PCT No.: PCT/DK00/00709

§ 371 (c)(1),
(2), (4) Date: Aug. 9, 2002

(87) PCT Pub. No.: WO01/58802
PCT Pub. Date: Aug. 16, 2001

(65) Prior Publication Data

US 2003/0000971 A1 Jan. 2, 2003

(30) Foreign Application Priority Data

Feb. 14, 2000 (DK) .................................. PA 2000 00229

(51) Int. Cl.⁷ ............................................... B65D 83/00
(52) U.S. Cl. ................ 222/399; 222/400.7; 137/505.14
(58) Field of Search .............................. 222/146.6, 399, 222/400.7; 137/468, 505.14

(56) References Cited

U.S. PATENT DOCUMENTS

| 4,887,651 A | * 12/1989 | Santiago ...................... 222/399 |
| 5,174,326 A | * 12/1992 | Steinert et al. ............. 137/468 |
| 5,564,602 A | * 10/1996 | Cleland et al. .......... 222/146.6 |
| 5,730,323 A | * 3/1998 | Osborne ...................... 222/399 |

FOREIGN PATENT DOCUMENTS

| DE | 3429399 | * 7/1985 |
| FR | 2490311 | * 3/1982 |

* cited by examiner

Primary Examiner—Philippe Derakshani
(74) Attorney, Agent, or Firm—Cooper & Dunham LLP; Donald S. Dowden

(57) ABSTRACT

A dispensing assembly for automatically adjusting the carbon dioxide level in beer in a draught beer keg (1), said dispensing assembly comprising a beer tap (3) to be placed in the outlet opening (2) of the draught beer keg, a tapping cock (5) connected to said beer tap, a reducing valve (9) communicating with the beer tap (3) and a carbon dioxide compressed air cylinder (7) which in turn communicates with the reducing valve (9). The low pressure side of the reducing valve (9) is directly connected to a gas channel (3a) in the housing of the beer tap (3), said gas channel communicating with the interior of the keg. The reducing valve (9) is a needle/cone valve, where the valve body is controlled by a bellows device (30) arranged in the housing of the valve and including a closed control gas mixture (21) which at least includes carbon dioxide.

9 Claims, 3 Drawing Sheets

DISPENSING ASSEMBLY FOR AUTOMATICALLY ADJUSTING THE CARBON DIOXIDE LEVEL IN BEER IN A DRAUGHT BEER KEG

TECHNICAL FIELD

The invention relates to a dispensing assembly for automatically adjusting the carbon dioxide level in beer in a draught beer keg, the assembly being of the type stated in the introductory clause of claim 1.

BACKGROUND ART

Most draught beer dispensing assemblies are not provided with any type of automatic adjustment of the carbon dioxide level in the draught beer. The carbon dioxide level in the beer has for instance been manually adjusted by means of a valve and an associated manometer placed on the carbon dioxide compressed air cylinder. The carbon dioxide level in the beer is closely correlated with the beer temperature. When the carbon dioxide level is too high, the beer foams, and when the level is too low the beer turns flat. It is also known that a change of the draught beer keg requires a readjustment of the carbon dioxide level in order to prevent the beer from foaming or turning flat. Such a procedure is necessary because the new draught beer keg has a temperature differing from the temperature of the just emptied draught beer keg, typically because said draught beer kegs are not stored in the same room.

Previous attempts at solving this problem involved electric control systems comprising electric pressure and temperature sensors as well as electrically controlled valves. In a known assembly the carbon dioxide level is controlled by means of a valve with a secondary liquid, said valve not being directly connected to the beer keg. When beer is tapped from this dispensing assembly, the beer flows through the valve and transfers its temperature to the secondary liquid, which in turn acts on a valve seat opening and closing the feeding of carbon dioxide.

As the valve is not connected to the draught beer keg, said valve and said beer in the keg do not necessarily have the same temperature, which can cause an undesirable flow of carbon dioxide into the keg.

The known control system are rather comprehensive and rather complicated. In addition, they require a substantial adaptation when they are to be mounted on a new beer keg. Furthermore, the initial costs are relatively high.

FR-A-2490311 discloses a reducing valve to keep the $CO_2$-concentration of beer constant at different temperatures. This reducing valve has a bellows device but this is not fixedly mounted in the housing of the valve. The bellows device contains glycerine, not a control gas mixture. Further nothing is mentioned about the reducing valve (formed as a needle/cone valve) being directly connected to a gas channel in the housing of the beer tap.

DE-A-3429299 discloses a beer engine comprising a $CO_2$-cylinder, a primary and a secondary reducing valve, a draught beer keg, a beer tap on said keg and a tapping cock. The primary and the secondary reducing valves are not directly connected to a gas channel in the housing of the beer tap.

BRIEF DESCRIPTION OF THE INVENTION

The object of the invention is to provide a dispensing assembly of the above type which presents a very simple structure, which is easy to adjust to an existing draught beer equipment, and which furthermore is inexpensive to buy.

The dispensing assembly according to the invention is characterised in the features stated in the characterising clauses of claim 1. As a result, a very high structural simplicity is obtained because it is utilized that the reducing valve and the beer in the beer keg always have the same temperature, an equalization of the temperature between the beer keg and the reducing valve taking place through the housing of the beer tap. Accordingly, no particular thermosensor is necessary in connection with the reducing valve. The control gas mixture of the bellows device has the effect that the reducing valve is opened just so much that the amount of carbon dioxide passing through the reducing valve ensures that the beer in the keg is provided with a desired carbon dioxide level of R (% by weight) within a temperature range preferably being 5 to 30° C. The dispensing assembly requires almost no adaptation to the existing draught beer equipment because the reducing valve used is easy to connect to the existing beer tap. Accordingly the dispensing assembly is inexpensive to install.

The carbon dioxide level R (% by weight) of the beer may according to the invention be in the range of 0.48 to 0.57% by weight, especially 0.51 to 0.55% by weight, preferably approximately 0.53% by weight. The resulting dispensing assembly can be used for the most frequent types of beer; in Scandinavia the beer presents predominantly an R of approximately 0.53% by weight.

In addition to carbon dioxide, the control gas mixture may include Freon 134A or a gaseous hydrocarbon, such as butane, with the result that said assembly can be adapted to beer types with a rather differing carbon dioxide level (R).

Moreover, the carbon dioxide of the control gas mixture may according to the invention represent 10 to 30% by volume, preferably 12 to 25% by volume of the control gas mixture, which turned out to be particularly advantageous.

Furthermore, when R is approximately 0.53% by weight, the carbon dioxide of the control gas mixture may according to the invention represent approximately 15% by volume and Freon 134A may represent approximately 85% by volume. The resulting assembly is particularly suited for the types of beer typical in Denmark and the remaining Scandinavia.

Moreover, when R is approximately 0.60% by weight, the carbon dioxide level may according to the invention represent approximately 20% by volume, and the content of gaseous hydrocarbon may represent approximately 80% by volume, whereby the assembly is particularly suited for use in connection with dispensing of types of beer from the Southern Germany.

According to the invention the needle/cone valve may be shaped such that it can operate with both high and low carbon dioxide pressures because the cone is provided with a slightly convex appearance compared to a geometrical cone. As a result the needle/cone valve can, as mentioned above, operate at both high pressures, viz. at 60 to 80 bar, where it receives the carbon dioxide directly from the carbon dioxide compressed air cylinder, and at low pressures, viz. at 4 to 5 bar, provided a conventional reducing valve is mounted at said compressed air cylinder.

Furthermore, the bellows device may according to the invention comprise a cup of sheet material, where a metal sheet bellows is secured inside said cup in a sealing manner, preferably by way of welding, so as to provide a closed chamber for the control gas mixture between said cup and said bellows. As a result, the bellows device can always act on the needle/cone valve body in such a manner that no manual adjustment of the valve is required.

Finally, the metal sheet bellows may according to the invention be in form of a body of revolution with a central projection which is adapted to press the valve body in the needle/cone valve into an open position through a strut, said valve body, however, also being subjected to an oppositely acting force by a pressure spring arranged in the valve housing. The resulting embodiment turned out to be particularly advantageous.

It should be noted that the reducing valve, as well as the dispensing assembly, is completely free of electric installations and does not require any manual adjustment. As the reducing valve is not passed by beer, said reducing valve does not suffer from any risk of sanitary problems.

BRIEF DESCRIPTION OF THE DRAWINGS

The invention is explained in detail below with reference to the accompanying drawings, in which.

BEST MODE FOR CARRYING OUT THE INVENTION

Figure 1:
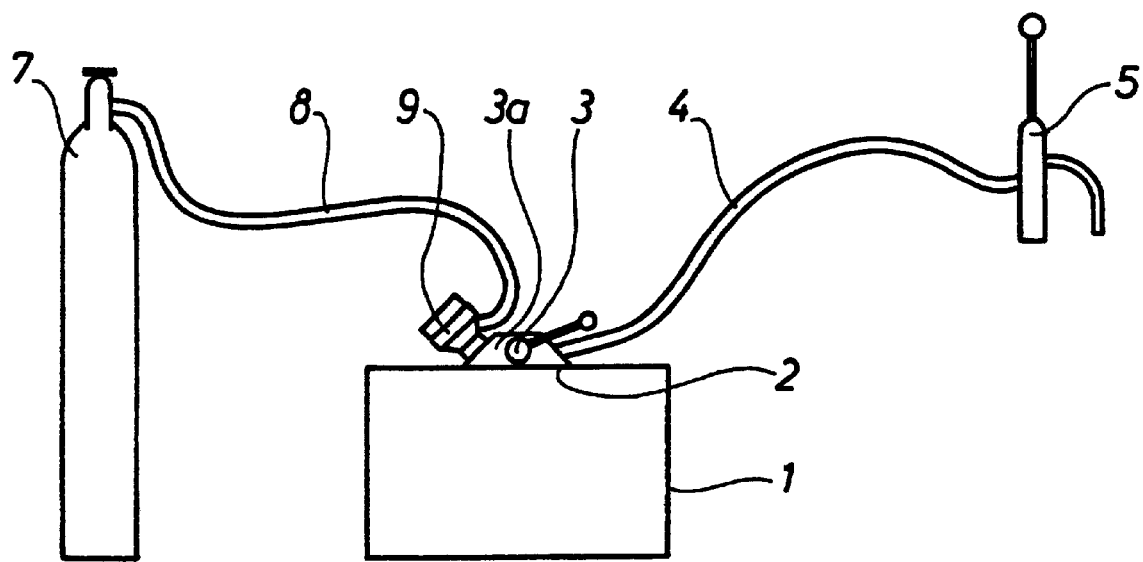
FIG. 1 is a diagrammatic view of an embodiment of the dispensing assembly according to the invention.
Figure 2:
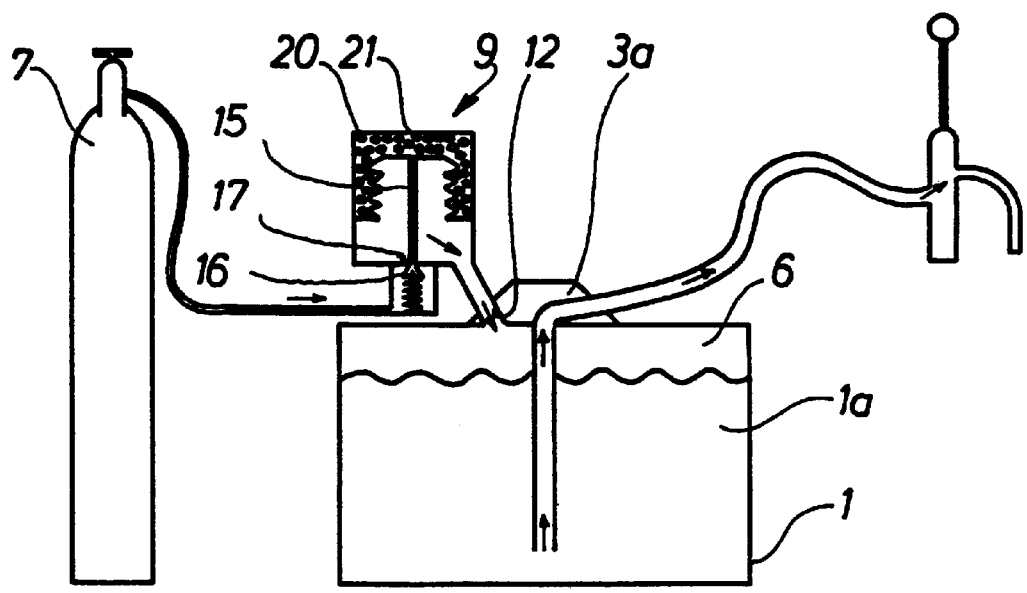
FIG. 2 shows a flow sheet of the embodiment of FIG. 1.

The dispensing assembly shown in FIG. 1 serves to automatically adjust the carbon dioxide level in beer in a draught beer keg 1. This dispensing assembly comprises a beer tap 3 arranged in the outlet opening 2 of the draught beer keg. In addition, the dispensing assembly comprises a tapping cock 5 connected to the beer tap through a hose 4 and from which the draught beer can be dispensed, as well as a carbon dioxide compressed air cylinder 7. This compressed air cylinder 7 is connected to the delivery side of a reducing valve 9 through a pressure hose 8, said reducing valve 9 in turn being directly connected to the housing 3a of the beer tap. FIG. 2 is a rather diagrammatic view of how the individual parts of the dispensing assembly are interconnected.

It appears that the reducing valve 9 is directly connected to a gas channel 12 arranged in the housing 3a of the beer tap, said gas channel communicating with the interior 6 of the keg 1.

It appears that the reducing valve 9 is shaped as a needle/cone valve, viz. a valve where the valve body is formed by a "needle" 15, a cone 16 being arranged at the lower end of said "needle" 15. The valve cone can abut a valve seat 17. The needle/cone valve is provided with a bellows device 20 comprising a closed control gas mixture 21 which has been symbolically marked by way of a row of small circles and which at least includes carbon dioxide and Freon 134A. Through the "needle" 15, the bellows device can act on the valve cone 16 in such a manner that the valve 9 is opened and closed when the control gas mixture expands or contracts. The components of the control gas mixture and the present amounts of said components are selected such that the carbon dioxide pressure-temperature-relation of the beer in the keg 1 within a predetermined temperature range, preferably 5 to 30° C., coincides substantially with the carbon dioxide pressure-temperature-curve for beer with a constant carbon dioxide level of R (% by weight) in the temperature range. R is in the range of 0.43 to 0.62% by weight.

Figure 4:
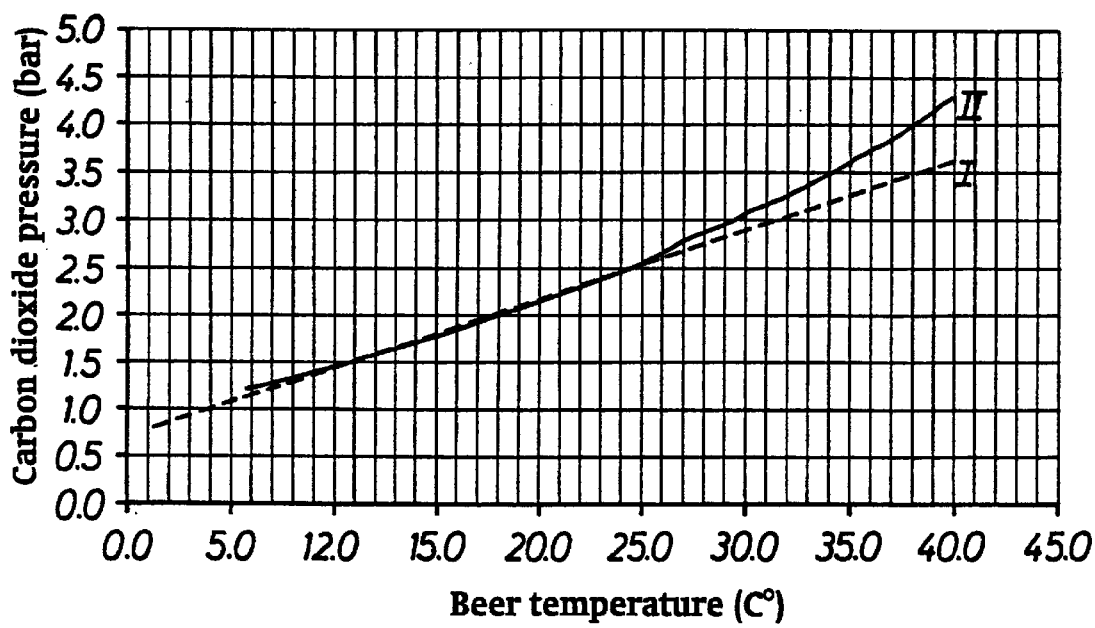
FIG. 4 shows curves illustrating the carbon dioxide pressure versus the beer temperature.

FIG. 4 shows the carbon dioxide pressure in the beer versus the beer temperature. The ideal curve I shows the correlation between pressure and temperature when the amount of carbon dioxide in the beer in the temperature range of 5 to 30° C. must be constant R=0.53% by weight. The curve II illustrates how a carbon dioxide pressure-beer-temperature-relation is obtained which in most of the temperature range 5 to 30° C. coincides exactly with the ideal curve I or is very similar thereto in connection with a control gas mixture including carbon dioxide and Freon 134A.

When the dispensing assembly is to be used for maintaining an increased carbon dioxide level in the beer of for instance R=0.60% by volume, the ideal curve is slightly upwardly displaced relative to the curve I. In this case another control gas mixture is used, such as a mixture including carbon dioxide and a gaseous hydrocarbon, such as butane. In the latter case, the curve corresponding to the curve II is found slightly above the curve II, but quite close to the ideal curve.

The carbon dioxide level R (% by weight) of the beer 1a can be in the range of 0.48 to 0.57% by weight, especially 0.51 to 0.55% by weight, preferably 0.53% by weight.

The carbon dioxide of the control gas mixture 21 can represent 10 to 30% by volume, preferably 12 to 25% by volume of the control gas mixture.

When the carbon dioxide level of the beer is approximately 0.53% by weight (R=approximately 0.53% by weight), the carbon dioxide level of the control gas mixture 21 can represent approximately 15% by volume, and the contents of Freon 134A can be approximately 85% by volume.

On the other hand, when the carbon dioxide level of the beer must be approximately 0.60% by weight (R=approximately 0.60% by weight), the carbon dioxide level of the control gas mixture 21 can represent approximately 20% by volume and the content of gaseous hydrocarbon, such as butane, approximately 80% by volume.

Figure 5:
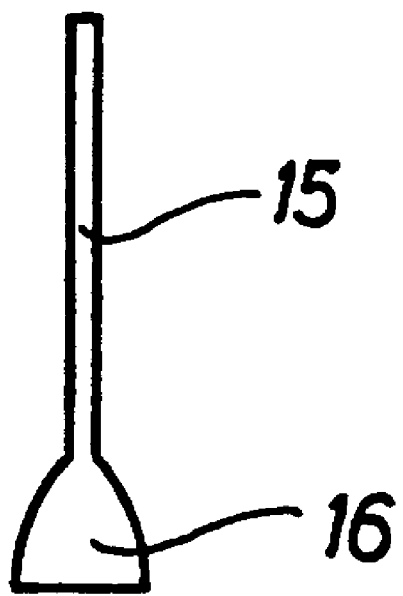
FIG. 5 is a side view of the valve body in the needle/cone valve.

FIG. 5 shows how the valve body of the needle/cone valve comprises said needle 15 and a substantially conical body 16. It appears that the cone presents a slightly convex appearance compared to a geometrical cone. As a result, the needle/cone valve can operate at both high and low carbon dioxide pressures.

Figure 3:
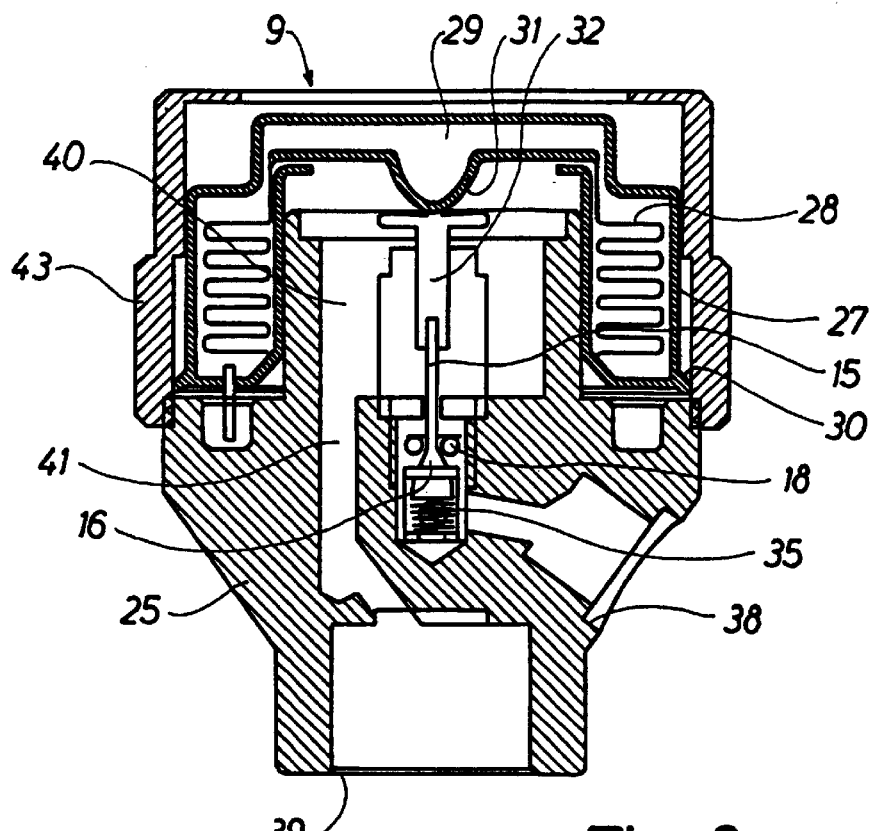
FIG. 3 is a longitudinal sectional view through the reducing valve according to the invention.

FIG. 3 shows the structure of the reducing valve 9 in greater detail. The reducing valve comprises a socket 25, a valve body in form of the needle 15 and the cone 16. It appears that the valve seat is formed by an O-ring 18. The above bellows device is mounted on the socket 25. The bellows device can comprise a cup 27 of sheet material. A metal sheet bellows 28 is secured, preferably by way of welding 30, inside the above cup 27 so as to provide a closed chamber 29 for the control gas mixture between the cup and the bellows. As illustrated, the metal sheet bellows 28 can be shaped as a body of revolution with a central projection 31 which is adapted to press the valve body 15, 16 into an open position through a strut, said valve body 15, 16, however, also being subjected to an oppositely acting force by a pressure spring 35 arranged in the socket of the valve.

It should be noted that the pressure hose from the carbon dioxide compressed air cylinder is connected to the reducing valve at the opening 38 of said reducing valve. Thus the carbon dioxide enters the valve through the opening 38.

Subsequently, the carbon dioxide continues past the cone 16 and the O-ring 18, viz the valve seat, and further upwards into a chamber 40 below the projection 31 of the bellows device. From the chamber 40, the carbon dioxide passes through a channel 41 in the socket 25 and further outwards through the lower opening 39 of the valve, said lower opening communicating with the interior 6 of the keg 1 through the above gas channel 12 of the beer tap.

The invention may be modified in many ways without thereby deviating from the scope thereof.

What is claimed is:

1. A dispensing assembly for automatically adjusting the carbon dioxide level in beer in a draught beer keg, said dispensing assembly comprising a beer tap to be placed in the outlet opening of the draught beer keg, a tapping cock connected to said beer tap through a hose, a reducing valve communicating with the beer tap and a carbon dioxide compressed air cylinder which in turn communicates with the reducing valve through a pressure hose, characterised in that the reducing valve is formed as a needle/cone valve, the needle with the cone being controlled by a bellows device arranged in the housing of the valve, the bellows device including a closed control gas mixture and in that the reducing valve is directly connected to a gas channel arranged in the housing of the beer tap, and communicates with the interior of the draught beer keg, said control gas mixture at least including carbon dioxide and being selected such that the carbon dioxide-pressure-temperature-relation of the beer in the keg within a predetermined temperature range, preferably 5 to 30° C., coincides substantially with the carbon dioxide-pressure-temperature-curve for beer with a constant carbon dioxide level of R (% by weight) within said temperature range, R being in the range of 0.43 to 0.62% by weight.

2. The dispensing assembly as claimed in claim 1, characterised in that the carbon dioxide level R (% by weight) of the beer is in the range of 0.48 to 0.57% by weight.

3. The dispensing assembly as claimed in claim 1, characterised in that the control gas mixture in addition to carbon dioxide includes Freon 134A.

4. The dispensing assembly, as claimed in claim 1, characterised in that the carbon dioxide of the control gas mixture represents 10 to 30% by volume of said control gas mixture.

5. The dispensing assembly as claimed in claim 1, and where R is approximately 0.60% by weight, characterised in that the carbon dioxide of the control gas mixture represents approximately 20% by volume, and the content of gaseous hydrocarbon represents approximately 80% by volume.

6. The dispensing assembly as claimed in claim 1, and where R is approximately 0.53% by weight, characterised in that the carbon dioxide of the control gas mixture represents approximately 15% by volume, and Freon 134A represents approximately 85% by volume.

7. The dispensing assembly as claimed in claim 1, characterised in that the reducing valve is shaped such that it can operate with both high and low carbon dioxide pressures because the cone is provided with a slightly convex appearance compared to a geometrical cone.

8. The dispensing assembly as claimed in claim 1, characterised in that the bellows device comprises a cup of sheet material, where a metal sheet bellows is secured inside said cup in a sealing manner, so as to provide a closed chamber for the control gas mixture between the cup and the bellows.

9. The dispensing assembly as claimed in claim 1, characterised in that the metal sheet bellows is formed as a body of revolution with a central projection, which is adapted to press the valve body in the needle/cone valve into an open position through a pressure bar, said valve body also being subjected to an oppositely acting force from a pressure spring arranged in the socket of the reducing valve.

* * * * *